United States Patent [19]

Clin et al.

[11] 4,399,029

[45] Aug. 16, 1983

[54] APPARATUS FOR THE CONCENTRATION AND SORTING OF SOLID WASTE MATERIALS ACCORDING TO THEIR SHAPES, THEIR SIZES AND THEIR FLEXIBILITY

[75] Inventors: François H. Clin; Jean-Noël M. Gony, both of Orléans; François O. Proust, Olivet; Roger O. Cuvillier, Darvoy; Philippe J. Larrose, Jouy-le-Potier, all of France

[73] Assignee: Bureau de Recherches Geologiques et Minieres, Paris, France

[21] Appl. No.: 127,335

[22] Filed: Mar. 5, 1980

Related U.S. Application Data

[63] Continuation of Ser. No. 946,276, Sep. 27, 1978, abandoned.

[30] Foreign Application Priority Data

Sep. 28, 1977 [FR] France .............................. 77 29135

[51] Int. Cl.³ .............................................. B07B 1/24
[52] U.S. Cl. .................................... 209/234; 209/257; 209/290; 209/297
[58] Field of Search ................ 209/234, 241, 255–257, 209/263–265, 289, 290, 293, 294, 284, 299; 427/234; 198/396, 443, 658, 559, 616; 241/DIG. 30, DIG. 38, 79.2, 79.3, 80, 102

[56] References Cited

U.S. PATENT DOCUMENTS

| 685,908 | 11/1901 | Colgrove | 209/241 |
| 801,703 | 10/1905 | Anderson | 209/234 |
| 1,034,931 | 8/1912 | Ruiz | 209/290 |
| 1,301,277 | 4/1919 | Kronenberg | 209/234 |
| 1,450,145 | 3/1923 | Ellenwood | 209/234 |
| 2,064,554 | 12/1936 | Mahoney et al. | 209/452 |
| 2,136,686 | 11/1938 | Hardinge | 209/452 |
| 2,423,994 | 7/1947 | Petersen | 241/DIG. 38 |
| 2,828,853 | 4/1958 | Hart | 209/241 |
| 3,736,120 | 5/1973 | Tempe | 209/12 |

FOREIGN PATENT DOCUMENTS

| 354538 | 11/1937 | Italy | 209/294 |
| 128383 | 10/1926 | Switzerland | 209/12 |

*Primary Examiner*—Ralph J. Hill
*Attorney, Agent, or Firm*—Sughrue, Mion, Zinn, Macpeak & Seas

[57] ABSTRACT

Apparatus for the concentration and sorting of solid waste materials according to their shapes, dimensions, and flexibility without breaking recyclable items. For this purpose, the collar 10 of the apparatus which also comprises a means for extracting flexible products, incorporates lifting devices 11 of bevelled shape and provided with the lining 12 absorbing shocks on the items to be sorted. A portion of these are eliminated at C through large perforations 15, the large flat items being collected at B1, the items having three large dimensions being evacuated at B2.

10 Claims, 5 Drawing Figures

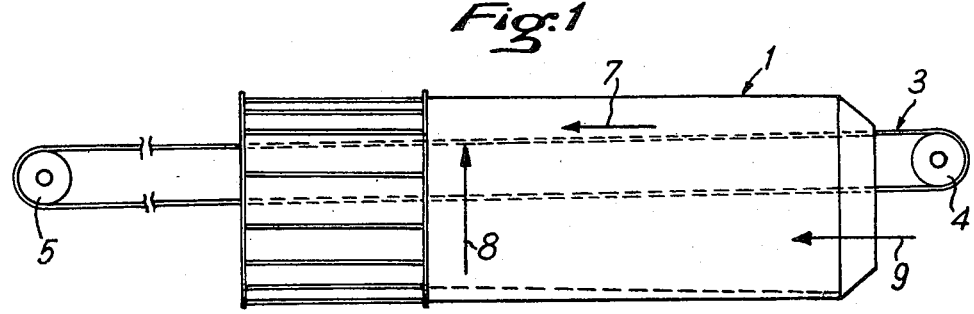
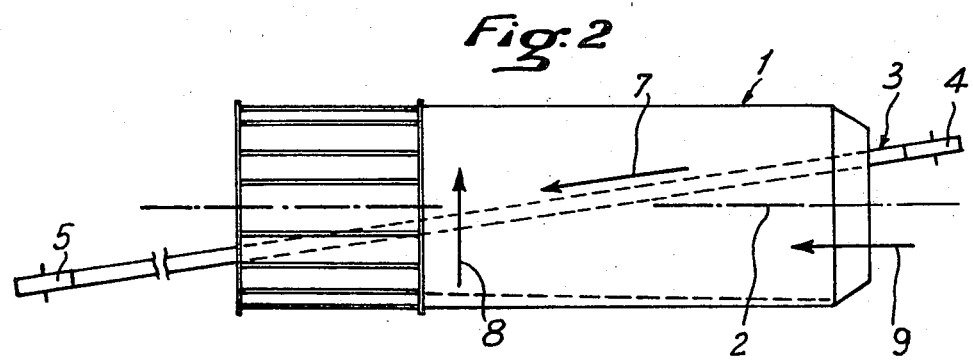
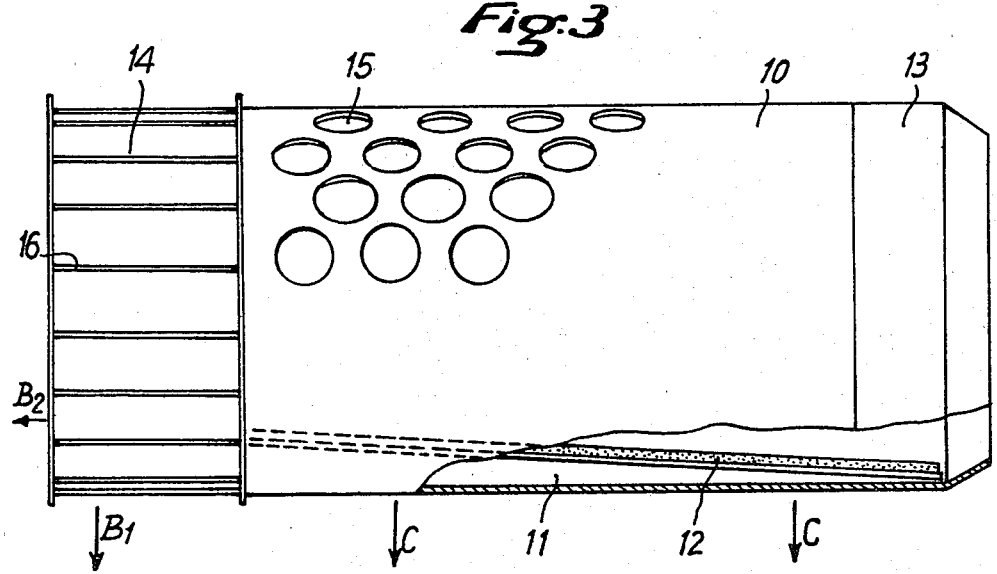

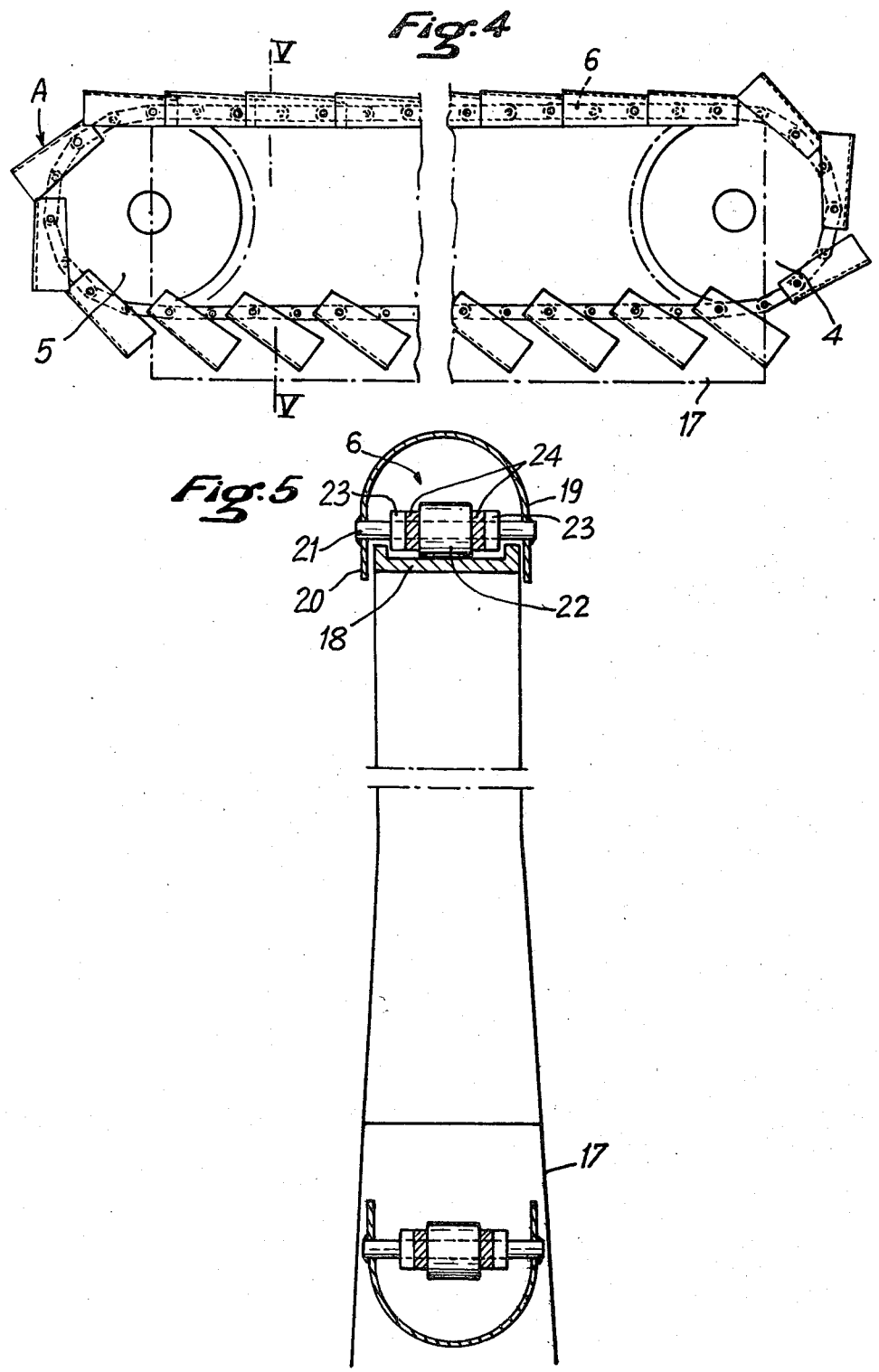

APPARATUS FOR THE CONCENTRATION AND SORTING OF SOLID WASTE MATERIALS ACCORDING TO THEIR SHAPES, THEIR SIZES AND THEIR FLEXIBILITY

This is a continuation of application Ser. No. 946,276, filed Sept. 27, 1978, now abandoned.

The present invention concerns an apparatus for the concentration and sorting of solid waste materials according to their dimensions and their flexibility, the apparatus also effecting at the same time a selection, as a function of their shapes, of voluminous products or occupying a certain space.

The sorting of flexible waste materials, such as rags, for example contained in solid waste, has already been obtained by means of revolving screens comprising a collar fitted with lifting devices and turning about its axis, the collar enclosing an endless cable extractor provided with lugs carrying along the rags driven by the lugs and falling on to the path of the extractor. This technique therefore permits the sorting of materials of flexibility comparable with rags, whilst ensuring the sorting of other materials by means of small perforations in the collar of the order of 50 mm, in accordance with prior art.

Waste materials comprising glass containers introduced into the revolving screen were therefore processed upon their introduction, the lifting devices crushing these containers until the very small dimensions of the perforations in the collar permits the crushed glass to flow out. Products of larger dimensions were recovered from the refuse, products of smaller dimensions being recovered through perforations in the collar provided for this purpose. These various products have the disadvantage of still being mixed with fine items and paper products contained in refuse simultaneously comprising scrap iron, flat items of cardboard and packagings of different sizes.

The object of the present invention is an apparatus for the concentration and sorting of solid waste materials and is of the type comprising a collar turning about its axis and an inner extractor, characterised in that the lifting devices, at least near the intake, are provided with shock absorbing means such as rubber, for example, and having a bevelled longitudinal profile reducing towards the intake, in such manner that, contrary to prior art revolving screens, fragile products escape the shock of the lifting devices at the intake of the apparatus.

In this manner it is possible to eliminate, upon entering the apparatus, any contamination of the products, particularly of voluminous products, by dust and the breakage of glasses.

Another object of the present invention is an apparatus of this type, capable of assisting the separation of dust from the waste and refuse by the immediate sorting of glass containers by providing apertures of sufficient dimensions in the area of the collar close to the intake, thus very rapidly eliminating uncrushed glass containers and dust.

Experience has also shown that it is possible to recover, at the outlet of the revolving screen, paper products practically free of dust and broken glass.

Another object of the present invention is an apparatus of this type whose extractor is provided as driving means of flexible items such as rags with a narrow, plane or convex, continuous surface, such as an endless or discontinuous belt or strap, such as plates, scales projecting or overlapping in all cases on both sides of their support and having a section with a plane or convex outer surface, in such manner that the extractor drives both rags and other flexible items of larger dimensions.

Furthermore, this method of driving or impelling said items makes it possible to avoid the risks of stuffing (clogging) due both to the method of driving by lugs, as in prior art, and to premature introductions of the edges of rags or other similar material between the driving means and its support. This method of driving also makes it possible to avoid the risks of fouling by the introduction of dust.

Another object of the invention is an apparatus of this type also effecting a concentration of flat paper products, and a separation of paper products of large dimensions, by providing the area of the collar, defined by the outlet, in the form of a squirrel cage, the spacing of the bars being at least of the same order of magnitude as the diameter of the perforations in the body of the collar and the length thereof being of the order of 3 to 4 times such spacing.

Experience shows that flat paper products, such as newspapers, magazines, flat cartons and small packages may be collected through the cage, the refuse comprising practically only voluminous paper products, such a selection being impossible with prior art apparatus.

Other advantages and features of the present invention will be apparent from the following description, made with reference to the accompanying drawings, which show, by way of example only, an embodiment of the apparatus.

With reference to the drawings:

FIG. 1 is a schematic representation of the entire apparatus, seen in profile;

FIG. 2 is a schematic top view of the apparatus;

FIG. 3 is a partially broken away schematic view of the collar;

FIG. 4 is a schematic view in profile of the extractor; and

FIG. 5 is a partial cross-section of the extractor taken on the line V—V of FIG. 4.

The apparatus comprises a revolving screen 1, FIGS. 1 and 2, turning about its axis 2, and an extractor 3 mounted to pass through the upper portion of the revolving screen. The position of the extractor is adjustable in order to modify its slope and its direction as a function of the quality of the concentrate of flexible materials.

The feeding and discharging devices of the products passing through or extracted from the apparatus may be of any type and are therefore not shown.

The same applies also to the supports of the apparatus, whether it is the support of the revolving screen 1 or of those of the extractor. Only the toothed wheels 4 and 5, supporting the driving means 6, FIG. 4, of the extractor, are shown in FIGS. 1 and 2. The arrow 7 indicates the direction in which the flexible products are driven by the extractor 3, the arrow 8 indicating the direction of rotation of the revolving screen and the arrow 9 the direction and the preferred location for the introduction of solid waste materials into the revolving screen 1.

The collar of the revolving screen is shown schematically by 10 in FIG. 3 and comprises, along certain generatrices, lifting devices 11 such as that shown below the broken-away portion. These lifting devices are bevelled so that glass containers coming from the intake 9 are not engaged by the lifting devices 11. Furthermore, these lifting devices are provided with shock absorbing means such as a rubber lining 12 also assisting to absorb shock due to contact between glass containers and the lifting devices.

The portion of the collar 10, between the intake zone or between the end of the intake 13 and the outlet zone 14, is provided with large perforations 15 permitting the waste fraction, composed of small objects enriched with glass containers, most of which are still intact. This fraction is indicated by the arrows C and extends under the entire area of the collar comprising the large perforations 15, the lifting devices 11 driving the flexible items which drop onto the extractor 3 and increasingly disengage the perforations 15. The term "perforation" should be understood in its broad sense, since said perforations may be of any type and adapted if desired to certain types of waste materials.

The outlet zone 14 is formed by a squirrel cage, the bars 16 of which have a spacing of the same order of magnitude as the size of an opening 15. For example, the perforation 15 may be selected in an order of 150 to 300 mm in aperture and bars 16 with a length of 600 to 1200 mm with a spacing of 150 to 300 mm.

This zone makes it possible to collect at B1 flat paper products such as newspapers, flat cartons, leaflets, magazines, as well as various packages refused at C, and to collect at B2 the refuse formed by paper products of large dimensions, such as cardboard boxes.

The fraction of flexible products removed by the extractor is shown at A in FIG. 4. In this Figure, there is selected as driving means 6 of the extractor support of the flexible products, a chain engaging on the toothed wheels 4 and 5, the driving wheel being preferably the wheel 4 located on the intake side of the revolving screen. The lower return length of this chain is protected from the scattering of waste by a protecting case 17, also shown in FIG. 5, enclosing the side portions of the return length and the entire space between both lengths.

The chain 6 is guided at the bottom by a sliding and guiding support 18 and carries the extractor support forming a protecting sheath 19 preferably comprising the side portions 20, sufficient in size for completely protecting the chain. Therefore any rags, any flexible bodies and any plastic films of sufficient dimensions can be picked up by a surface ensuring good adhesive contact thereof as far as the outlet of the revolving screen. Furthermore, the lateral projection of the surfaces 20 of the extractor support 19 makes it possible to reduce to the minimum the contact of flexible products conveyed with the entire fixed portion.

According to the embodiment shown in FIG. 5, the chain 6 is formed of links 23 and 24 joined on the axes 21. Since these axes are parallel, they prevent any lateral sweeping of the chain and make it possible to drive any continuous or discontinuous extractor support. In the embodiment shown, the axes 21 support a roller 22, the guide 18 forming a roller path. According to the invention and when the support 19 is formed of a succession of overlapping plates or scales, they are fixed to the driving device so that, in the course of their movement over the return wheel 5, the front and free end thereof still covers the rear portion, fixed to the driving device of the preceding plate or scale. Experience has shown that this device, associated with the method of driving the chain by the toothed wheel located on the feeding side of the revolving screen, makes it possible to ensure perfect discharge of all flexible items.

It is obvious that numerous modifications of details or substitutions of items may be effected without departing from the scope of the present invention, whether it is a question of the collar being able to comprise lifting devices inclined towards the generatrices or the extractor, the chain links of which could be simply covered with a flexible band. Similarly, the portion of the collar close to the intake may be lined with rubber. As to the return length, composed of the extractor support and its driving chain, this may be preferably provided below the revolving screen, particularly in large installations. Although, in the example given, the plates of the return length are shown in their inclined position, the apparatus may comprise locking mechanisms keeping the plates in the horizontal position after the passage of the return wheel 5. As to the perforations in the collar, the shapes thereof may be adapted to any kind of unsorted items, if desired.

What is claimed is:

1. Apparatus for concentrating and sorting solid waste materials, comprising:
   a revolving screen, said revolving screen having an intake zone, a central zone and an outlet zone, said central zone comprising a cylindrical member having apertures of a size permitting common glass container objects to pass therethrough and said outlet zone comprising a plurality of parallel bars arranged in a squirrel cage fashion and having a spacing between adjacent bars of the same order of magnitude as the size of said apertures in said central zone, and having a length substantially longer than the size of said apertures;
   at least one lifting device disposed in said central zone and extending substantially from near said intake zone to near said outlet zone, said lifting device having a bevelled longitudinal profile decreasing in height towards said intake end;
   a shock absorbing lining covering said lifting device at least over a portion thereof near said intake end;
   means for rotating said revolving screen; and
   an extractor for collecting flexible products, said extractor comprising an endless conveyor member rotatable between two wheels, at least a portion of said endless conveyor member extending longitudinally through said revolving screen.

2. Apparatus as claimed in claim 1, wherein the bars of the squirrel's cage have a length of the order of 3 to 4 times the opening of the perforations in the collar.

3. The apparatus as claimed in claim 1 wherein said apertures have a diameter and said bars having a spacing of 150 to 300 mm.

4. The apparatus as claimed in claim 3 wherein said bars have a length of 600 to 1200 mm.

5. Apparatus as claimed in claim 1, wherein said extractor further comprises a plurality of overlapping plates coupled to said conveyor member, said plates being disposed in order to present, during their passage over a return wheel located at the outlet of the apparatus, an arrangement such that the front and free end of each said plate covers the rear part of an adjacent plate.

6. Apparatus as claimed in claim 5, wherein said endless conveyor member is a chain conveyor having a plurality of chain links being articulated about parallel axes and engaged on said wheels, said wheels being toothed, the conveyor being carried by a slide guide, said slide guide being covered at its sides.

7. Apparatus as claimed in claim 6 wherein one of said toothed wheels comprises a toothed wheel located proximate the intake zone of the revolving screen for driving said endless conveyor member.

8. Apparatus as claimed in claim 6, further comprising a case for protecting the return length of the chain.

9. The apparatus as claimed in claim 8, wherein said case encloses the side portions of the return length of said chain through said revolving screen.

10. Apparatus as claimed in claim 8 wherein the return of the extractor is effected below the revolving screen.

* * * * *